United States Patent
Veits

(10) Patent No.: US 8,081,633 B2
(45) Date of Patent: Dec. 20, 2011

(54) NETWORK NODE UNIT AND METHOD FOR FORWARDING DATA PACKETS

(75) Inventor: Oliver Veits, Dachau (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 646 days.

(21) Appl. No.: 11/792,559

(22) PCT Filed: Jul. 11, 2006

(86) PCT No.: PCT/EP2006/064079
§ 371 (c)(1),
(2), (4) Date: Jun. 7, 2007

(87) PCT Pub. No.: WO2007/012559
PCT Pub. Date: Feb. 1, 2007

(65) Prior Publication Data
US 2007/0258462 A1    Nov. 8, 2007

(30) Foreign Application Priority Data
Jul. 27, 2005   (DE) .......................... 10 2005 035 201

(51) Int. Cl.
*H04L 12/56* (2006.01)
(52) U.S. Cl. ..... 370/393; 370/397; 370/399; 370/395.5; 370/409; 370/428
(58) Field of Classification Search ............. 370/392, 370/498, 396, 349, 395.5, 393, 397, 399, 370/409, 428; 714/4
See application file for complete search history.

(56) References Cited

U.S. PATENT DOCUMENTS

| | | | |
|---|---|---|---|
| 6,501,754 B1* | 12/2002 | Ohba et al. | 370/389 |
| 6,639,901 B1* | 10/2003 | Katzri et al. | 370/255 |
| 7,042,890 B2* | 5/2006 | Maynard | 370/401 |
| 7,046,679 B2* | 5/2006 | Sampath et al. | 370/395.53 |
| 7,352,753 B2* | 4/2008 | Glad et al. | 370/395.53 |
| 7,542,470 B2* | 6/2009 | Gupta et al. | 370/392 |
| 7,558,273 B1* | 7/2009 | Grosser et al. | 370/395.53 |
| 7,684,403 B2* | 3/2010 | Kim et al. | 370/392 |
| 7,796,612 B2* | 9/2010 | Sampath et al. | 370/395.53 |
| 7,869,411 B2* | 1/2011 | Tzeng | 370/338 |
| 7,953,007 B2* | 5/2011 | Aimoto et al. | 370/230.1 |

(Continued)

FOREIGN PATENT DOCUMENTS
EP        1 551 131 A1    7/2005
(Continued)

OTHER PUBLICATIONS

Load optimal MPLS routing with N + M labels; Applegate et al. 2003 IEEE.*

(Continued)

*Primary Examiner* — Salman Ahmed

(57) ABSTRACT

A network node unit and a method for forwarding data packets are provided. The network node unit is designed for forwarding data packets provided with a virtual network tag and comprises an identified cascading depth of the virtual network tag in the data packets which exceeds a predefined cascading depth, a filtered forwarding of data packets provided with a cascaded virtual network tag in accordance with the predefined and the identified cascading depth, and an administration table for entering the virtual network tag and address data of the data packets in accordance with the predefined and the identified cascading depth.

8 Claims, 2 Drawing Sheets

U.S. PATENT DOCUMENTS

| | | | |
|---|---|---|---|
| 2002/0009050 A1* | 1/2002 | Ueno | 370/230 |
| 2002/0009081 A1* | 1/2002 | Sampath et al. | 370/389 |
| 2003/0120763 A1* | 6/2003 | Volpano | 709/223 |
| 2004/0081171 A1 | 4/2004 | Finn | |
| 2004/0190517 A1* | 9/2004 | Gupta et al. | 370/392 |
| 2005/0063397 A1 | 3/2005 | Wu et al. | |
| 2005/0190773 A1* | 9/2005 | Yang et al. | 370/395.53 |
| 2005/0220148 A1* | 10/2005 | DelRegno et al. | 370/498 |
| 2006/0013232 A1* | 1/2006 | Xu et al. | 370/396 |
| 2006/0036892 A1* | 2/2006 | Sunna | 714/4 |
| 2006/0120389 A1* | 6/2006 | Sampath et al. | 370/401 |
| 2007/0115913 A1* | 5/2007 | Li et al. | 370/349 |
| 2009/0022053 A1* | 1/2009 | Aimoto et al. | 370/230 |
| 2009/0154471 A1* | 6/2009 | Kim et al. | 370/395.53 |

FOREIGN PATENT DOCUMENTS

WO    WO 2004/039001 A1    5/2004

OTHER PUBLICATIONS

Asymmetric Tunnels in P2MP LSPs as a Label Space Reduction Method; Solano et al. ICC 2005.*

Exploring the Trade-off Between Label Size and Stack Depth in MPLS Routing; Gupta et al. 2003 IEEE.*

Tarek Saad, Basel Alawieh and Hussein T. Mouftah, "Inter-VLAN VPNs over a High Performance Optical Testbed", Proceedings of TRIDENTCOM'05, IEEE Computer Society, Feb. 2005, pp. 1-9.

* cited by examiner ized in the exchanged data packets by an identification number of the exchanged data packets by an identification number of the
NETWORK NODE UNIT AND METHOD FOR FORWARDING DATA PACKETS

CROSS REFERENCE TO RELATED APPLICATIONS

This application is the US National Stage of International Application No. PCT/EP2006/064079 filed Jul. 11, 2006 and claims the benefit thereof. The International Application claims the benefits of German application No. 102005035201.4 DE filed Jul. 27, 2005, both of the applications are incorporated by reference herein in their entirety.

FIELD OF INVENTION

The invention relates to a method and to a network node unit, preferably a switch, for forwarding data packets provided with a virtual network tag or VLAN ID.

BACKGROUND OF THE INVENTION

For logical segmenting of packet-oriented networks—often also called LAN, Local Area Network, among experts—an organization form of a virtual LAN is known. Standard IEEE 802.1Q defines a VLAN (Virtual LAN), i.e. a virtual local network within a physical network.

A VLAN is formed by a group of network node units which are combined in a "Broadcast Domain". A network node unit is conventionally configured here as a switch or bridge, etc. Network node units will hereinafter be described predominantly using the example of switches, without this specific choice of network node units constituting a limitation.

If a virtual LAN is to be expanded over a plurality of network node units then expansion of the MAC addresses ("Media Access Control") identifying aim and origin in the exchanged data packets by an identification number of the virtual LAN is advantageous. This identification number is usually called a VLAN number or "VLAN ID" or "Virtual LAN Identification Number".

Using a method called "Frame Tagging" a VLAN ID that marks the VLAN is inserted in a data packet as a "tag" or marker next to the type field of the MAC frame. This method is standardized in said IEE 802.1Q and uses a word length for the tag of 12 bits. Theoretically this results in the values 0 to 4095 for the VLAN ID. The VLAN IDs "0" and "4095" are reserved or not admissible, so the number of possible VLAN IDs is limited to 4094. In 802.1Q networks tag-free data packets can still be exchanged without a tag for reasons of compatibility.

One embodiment of a virtual LAN is what is known as the port-based VLAN. In this case a VLAN is fixed within an IP sub-network ("Internet Protocol") or across a plurality of IP sub-networks and mapped on a plurality of connections (>>port<<) of a network node unit. The network node unit is conventionally constructed as a switch; mapping of connections or ports of this switch is consequently called >>switch-port mapping<<.

Virtually all switches aid recognition and examination of the VLAN tag in an MAC frame. This recognition and examination takes place before each further processing and forwarding of the data packet. A packet arriving at a connection of a network node unit—switchport—that has not yet been tagged is tagged, i.e. provided with a VLAN tag. As soon as a data packet is to be transmitted from a switch to an envisaged communication aim, for example a computer involved in packet-oriented communication, this tag is conventionally taken from the MAC frame by the transmitting switch. This measure ensures inter alia use of network cards in computers which do not assist construction of the MAC frame according to 802.1Q.

In many cases processing software of a network node unit or a switch-provides tagging of data packets even for cases in which the data packets to be processed already contains a tag with a VLAN ID. In this case a new 802.1Q header with a new—in general different—VLAN ID is prefixed to an 802.1Q header with an existing VLAN tag or VLAN ID. The original 802.1Q header remains unchanged in the process even if it is displaced backwards by the length of the new 802.1Q header.

A prefix of this kind is also used in methods that are currently known for connecting to packet-oriented networks on the basis of 802.1Q tunneling methods which are intended to ensure a transparent connection to an Ethernet service.

In the prior art proprietary expansion of the protocol IEEE 802.1Q is known with which expansion of the limited number of 4094 possible VLAN IDs is possible. Here methods are used which are known as cascading of VLAN IDs. This cascading is taken to mean a hierarchical tag in which an additional 802.1Q header is added to the front of the original first 802.1Q header. This is equivalent to the approach where the original first VLAN ID is first of all stored in a data portion of the data packet before the tag field (tag) is overwritten with the second VLAN ID. The above-described tag, i.e. the original, first 802.1Q header, will hereinafter be called the base tag. The method should be analogously continued with a third, fourth, etc. VLAN ID, whereby a correspondingly more deeply hierarchized VLAN ID cascade is produced. A method of this type is used for example by service providers to allow use of one and the same infrastructure for a plurality of customers, wherein as far as possible the data packets exchanged by customers should not influence each other.

SUMMARY OF INVENTION

Cascading does not solve the problem that for a forwarding decision of a network element—in addition to other criteria—the VLAN ID is used in the base tag but not in more deeply cascaded VLAN IDs. In the case of the current prior art the situation occurs in the case of forwarding with multi-identical address information in the data packets of different senders of incorrect forwarding of subsequent data packets which are directed to these addresses that are duplicated in the network.

An item of multi-identical address information can be caused for example by a hacker using a false address.

An object of the invention is to provide means by which an address space is enlarged by cascading of data packets provided with a virtual network tag without an item of address information of the data packets leading to incorrect forwarding of the data packets.

A solution to this object takes place with respect to its device aspect by a network node unit and with respect to its method aspect by a method as provided by the independent claims.

A solution to this object takes place with respect to its device aspect by a network node unit with the features of claim 1 and with respect to its method aspect by a method with the features of claim 3.

According to the invention a network node unit is provided which is capable of recognizing and filtering cascaded markers (tags) in data packets. Filtering and "learning", i.e. entering the virtual network tag and items of address information of the data packets into an administration table, takes place as a function of the "predefinable" cascading depth of the switch and the cascading depth recognized in the data packets. The virtual network tag and items of address information, in particular MAC addresses, of the data packets are only entered in an administration table, if for example the cascading depth in the data packets does not go beyond the processing ability, i.e. the "predefinable" cascading depth of the network node unit.

The requirement for undertaking filtering (or filtered forwarding) of data packets and entry in the administration table takes place as a function of the cascading depth and the abilities of the switches to work through to a specific cascading level. On the one hand the address space is enlarged by cascading of the virtual network tag thereby and on the other hand multi-identical address information in the data packets of different senders does not lead to incorrect forwarding to the desired addressees either, as described in more detail in the following exemplary embodiment.

The means according to the invention therefore ensure that data packets are correctly delivered even where network node elements of different capabilities with respect to consideration of cascaded VLAN IDs exist.

BRIEF DESCRIPTION OF THE DRAWINGS

Exemplary embodiments with a description of advantages of the invention and developments by way of example will be described in more detail hereinafter with reference to the drawings, in which.

DETAILED DESCRIPTION OF INVENTION

Figure 1:
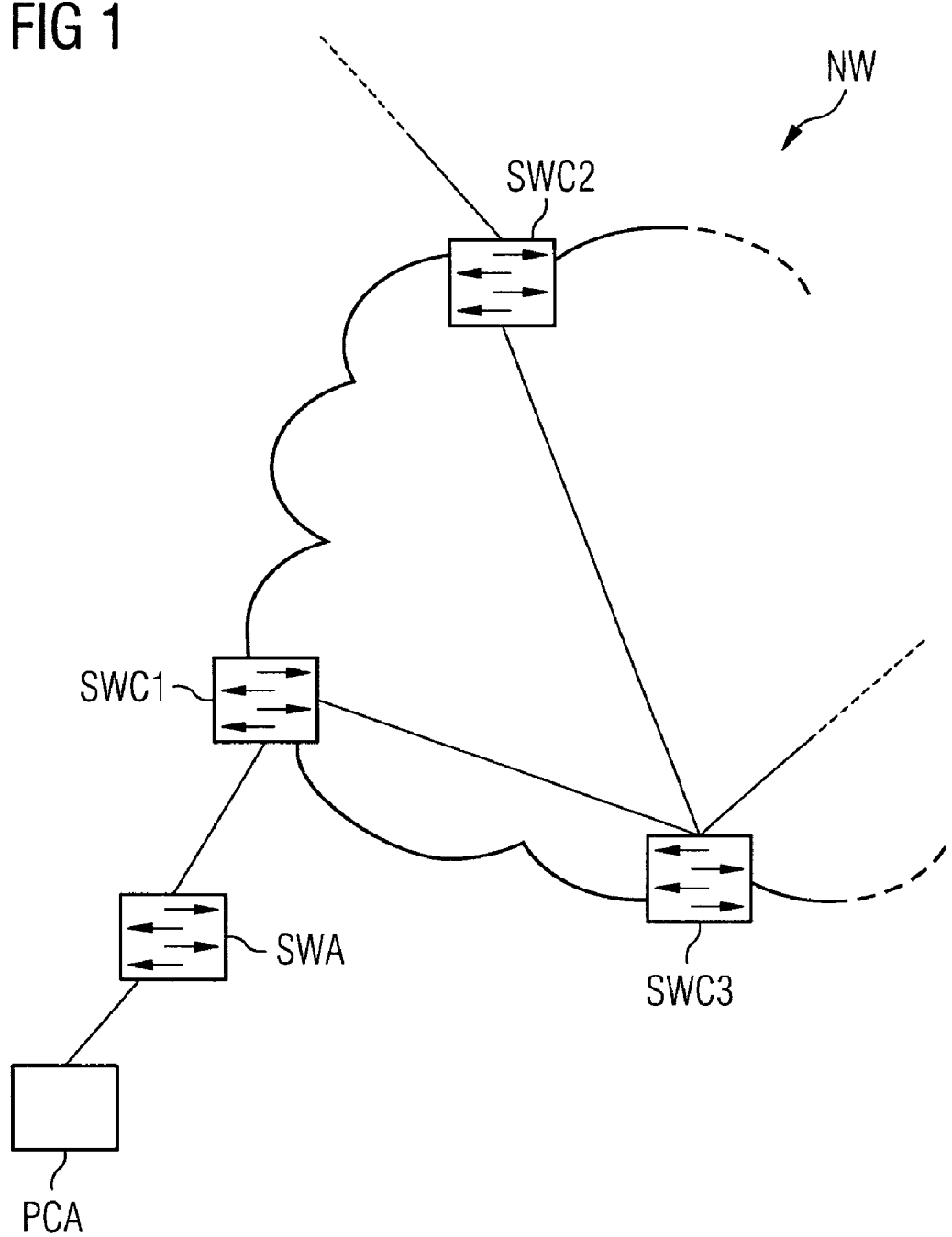
FIG. 1 shows a block diagram to schematically illustrate an arrangement of network node units in a network.

The properties of the network node units, which are configured as switches for example, used in the exemplary embodiment will be illustrated—initially without reference to the drawings.

A fundamental feature of a switch is to transfer received data packets to only those connections or "ports" which, owing to destination information entered in the data packets, are provided for this transfer. The destination information entered in the data packet comprises the MAC address (Media Access Control) of the destination system and the VLAN ID in the base tag. Data packets at a non-entered MAC address are forwarded to all connections of the same VLAN ID.

For this purpose an administration table for storing destination information and the associated port via which the destination system may be reached, is conventionally provided in a switch.

A switch checks data packets received at a port for source information contained in the data packet—in particular MAC address of the sender system or source MAC address and the VLAN ID of the received data packet. If the source information has not yet been entered in the administration table an entry is made which associates the source MAC address with the port and the VLAN ID on which the data packet was received. A time stamp with the arrival time is entered at the same time. If the source information of a data packet has already been entered the existing entry is retained and its time stamp updated. A new or modified entry in the administration table will also be called "learning" hereinafter. The data packet is then forwarded according to the destination information to the port entered in the table. This operation is called "filtering".

Depending on the configuration of the switch or the network node unit there exist different administration tables for the items of source or destination information. The term "table" is not to be understood as being limited to a specific form of data organization in this connection.

As soon as the entries in the administration table exceed a predefined limit the switch cannot store any new entries and forwards data packets with unknown destination information to all ports of the same VLAN ID. These data packets are "flooded" ("unicast flooding") within the same virtual LANs.

Forwarding of data packets with unknown destination information to all ports also occurs for the case where destination information of an incoming data packet has still not been entered in the administration table and for this reason is therefore—still—unknown. In this case the data packet is likewise forwarded to all ports of the switch within the virtual LAN, apart from those via which it was received.

A process that runs periodically is conventionally provided in the switch and is also called an "aging timer". This process checks the administration table and purges entries which are older than an adjustable period of time. This process prevents dated entries leading to the capacity of the administration table being exceeded. This type of purging of the administration table also has advantages with regard to the availability of portable terminals.

Moreover all switches have the properties according to the invention cited below:

1. The switches are capable of learning and filtering data packets according to the cascaded tags in data packets. The cascading depth of a data packet is given by N. It corresponds to the number of cascaded tags. In general: $N \geq 0$. For the case $N=0$ there is therefore an untagged data packet; for the case $N=1$ a data packet without cascading tagged with a VLAN ID; for $N>1$ there exists a cascaded, tagged data packet. The ability of a switch to process a data packet with the cascading depth N is also called the cascading depth. Since it is used to characterize the capacities of the switch that may be implemented, it is called the predefinable cascading depth N. With switches that are currently conventional $N=1$. The cascading depth N of a switch is used for a characterization through to which cascading depth data packets can be processed.

2. The switches are capable of recognizing whether there is an additional tag after the VLAN tag with the cascading depth N without evaluating the contents of the additional tag. For a switch characterized for example by $N=2$—which can therefore process up to two cascaded tags in data packets—this means that the switch also recognizes data packets with a cascading depth of three, four, etc. and proceeds with these according to point 3 below.

3. The switches learn and filter only data packets with a cascading depth of $\leq N$. According to the above example with a switch with a cascading depth of $N=2$, data packets with a cascading depth of three, four, etc. would therefore be neither filtered nor learned. In a learning process the MAC address, port and entire VLAN ID cascade is entered in the administration table.

Data packets which are neither filtered nor learned by a switch are conventionally forwarded to all connections (ports) of the switch, of which the VLAN ID matches the VALN ID in the tag field (tag) of the data packet. This applies even in the case of cascaded tags since the tags with $N>1$ are not stored in the portion of the data packet intended therefor but for example in a payload field of the data packet. It may however be advantageous to restrict forwarding of the data packets to all connections (ports) of which, as far as depth N, the allowed VLAN ID matches that of the data packet. If for example a data packet comprises a cascaded VLAN ID 5/6/7 and is processed at a switch with the capacity N=2, the data packet is then forwarded to all ports which are allowed for the VLAN cascade 5/6.

In a first embodiment it is first of all assumed that the computer PCA sends untagged data packets. This exemplary embodiment therefore applies to most workstation computers, in which no specific adjustments are made at the network cards or communication protocols.

FIG. 1 shows a portion of a packet-oriented network NW, formed from a plurality of switches SWA;SWC1,SWC2, SWC3. The last-mentioned switches SWC1,SWC2,SWC3 will also be called core switches hereinafter and form a network CORE which is connected in a transparent manner to a computer PCA via what is referred to as the provider switch SWA. The provider switch SWA is maintained by a data service provider. The design of the computer PCA is largely arbitrary, for example the computer PCA can be constructed as a workstation computer or as a network node unit, such as a router, switch, etc.

The provider switch SWA is characterized by a cascading depth of N=1. A data packet is accordingly sent from the computer PCA to the provider,switch SWA. The provider switch SWA first of all inserts a tag with a VLAN ID provided for the receiving port into the untagged received data packet.

The switch SWA accordingly recognizes that the processed data packet has exactly one tag and therewith its cascading depth of N=1 is not exceeded. A learning process follows therefore. In this learning process a source MAC address is taken from the MAC frame of the data packet in the switch SWA. The source MAC address is then entered in an administration table kept for a respective VLAN ID, therefore in the present case in the administration table which is kept for the VLAN ID with which the data packet was previously tagged by the provider switch SWA. At the same time a time stamp (aging timer) is set for the entry. If there is already an entry in the administration table for the source MAC address being considered, no entry is made.

A destination MAC address is also taken from the data packet. This destination MAC address is compared with destination MAC addresses of the administration table for this VLAN ID and if an identical destination MAC address is found transfer of the data packet to the location specified in the table is brought about.

If there is no entry of a destination MAC address in the MAC table which matches the destination MAC address given in the data packet, the data packet is sent to all connections or ports of the switch SWA being considered here (flooding) which are designed for the current VLAN ID, for example the port in the direction of the core switches SWC therefore.

The core switch SWC adds an additional tag to the data packet, received by the provider switch SWA, according to the principle of the cascading method. It is assumed below that the core switch SWC is capable of filtering only on a VLAN level, i.e. N=1 applies to this switch of the SWC also.

According to point 2 of the assumptions for all switches being considered here, the switch is capable however of recognizing that the data packet contains more than N, in the present case two, tags. This core switch SWC will not learn the source MAC address of the received data packet nor will it filter data packets, i.e. it will not forward the data packets to specific connections (ports), instead will carry out flooding, i.e. forward the received data packet to all ports.

If said property of a cascading depth of N=1 applies to all core switches SWC1,SWC2,SWC3, all data packets received at these switches will be flooded throughout the core network CORE but restrict themselves in the process to ports on which VLANC is allowed. It is then the function of an access switch SWA to carry out MAC address filtering in order not to load the customer with flooded data packets or unicast frames.

Figure 2:
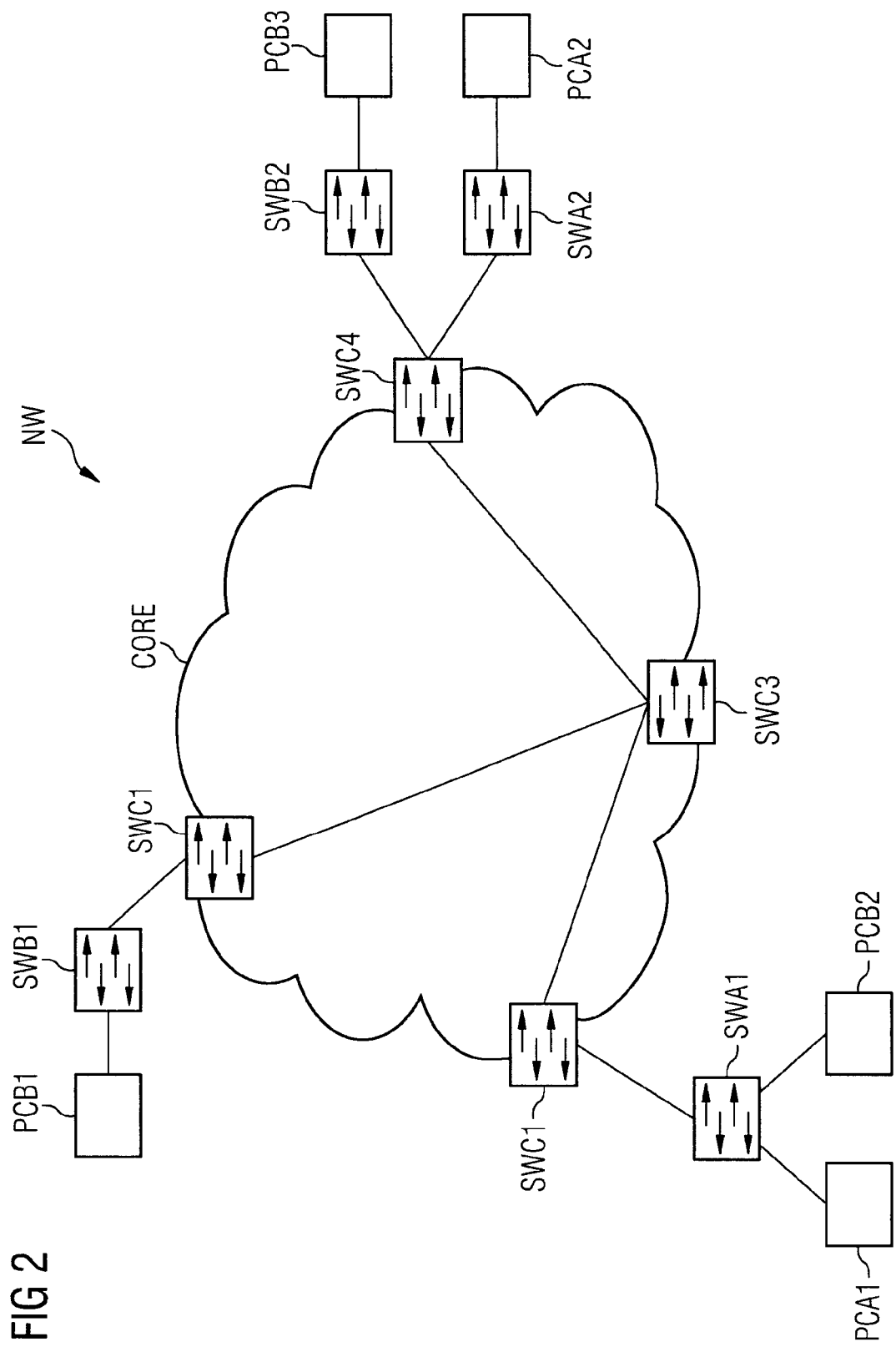
FIG. 2 shows a block diagram to schematically illustrate an arrangement of network node units in a larger portion of the network.

FIG. 2 shows the network NW known from FIG. 1 in a larger portion. Functional units with identical functional signs represent the functional units known previously from FIG. 1 with the exception of the computer PCA and the switch SWA known from FIG. 1 which are accordingly designated by the symbols PCA1 and SWA1.

A provider switch SWB1 is also connected to the core switch SWC2. A computer PCB1 is connected to the provider switch SWB1. A fourth core switch SWC4 which is connected to the provider switches SWA2, SWB2 is arranged inside the core network CORE. A further computer PCB3 is connected to the provider switch SWB2 and finally a computer PCA2 is connected to the provider switch SWA2.

Methods called "MAC address spoofing" affect the uninterrupted exchange of data in the network NW. This method is taken to mean use—generally with a malicious intent—of a non-allocated or non-registered MAC source address in transmitted data packets.

A non-malicious variant of spoofing occurs for example with connection of a router to a support of the 802.1Q protocol in an 802.1Q trunk connection. A router uses the same MAC address in a plurality of VLAN segments.

A further non-malicious variant of spoofing occurs with the use of test units for checking the exchange of data, which are known as traffic generators. As a standard function traffic generators provide a simulated transmission—also called MAC address sweeping—of test messages with different MAC addresses.

Finally a non-malicious form of spoofing also occurs in cases in which an individual customer of a provider is redundantly connected to a topology that is different for different customers—for example by using a >>Spanning Tree Protocol<<, STP. To avoid dual occupation it is often provided that the same network address is not allowed to be used in different VLANs. This meets with problems in the case of the above-mentioned router however since, as mentioned, a router uses the same MAC address in a plurality of VLAN segments.

It will be assumed hereinafter that there are two customers A and B (not shown) who are connected to a provider network via the switches SWA1, SWA2, SWB1, SWB2.

To describe prevention of MAC address spoofing using the method according to the invention it is assumed that executable software is provided on the computer PCB1 of customer B via which any desired source MAC address may be set with respect to communication of the computer PCB1. With respect to the data packets sent by this computer PCB1 the source MAC address therefore does not match the set MAC address of the network card (not shown) of the computer PCB1 for example.

It is also assumed that the source MAC address of computer PCB1 thus predefined is set in such a way that it is identical to the real source MAC address of computer PCA1. It is also assumed that the computer PCB1 has sent a series of data packets into the core network CORE in the recent past. Without using the method according to the invention the core switches SWC1, SWC2, SWC3, SWC4 would accordingly be set in such a way that they basically would filter with the aid of MAC addresses taken from the respective data packet.

A data packet sent from computer PCA2 could thus not reach computer PCA1 since all data packets which are sent by PCA2 are incorrectly sent via the third core switch SWC3 to only the second core switch SWC2. The data packets would thus never reach the actually desired first core switch SWC1 and, via this, the first computer PCA1.

Using the method according to the invention it is possible in 802.1Q tunneling networks to cascade a plurality of VLAN tags (and therewith connect more than 4094 customers) without problems with MAC address spoofing occurring in the network. It is at the discretion of a person skilled in the art to implement the teaching according to the invention such that he either uses switches, which are capable of considering all VLAN tags and filtering according to MAC addresses accordingly, in the core network CORE, or uses less expensive switches which take account of only a low cascading depth of the tag but offset this by dispensing with filtering in the core network CORE.

The procedure according to the invention may be used in the same way if a customer does not send any untagged data packets but only tagged packets to the switch SWA1.

In a first embodiment access switches SWA1 are used for this case and these can recognize at least two tags, i.e. a predefinable cascading depth of $N \geq 2$. A customer's tag is designated VLAN_a; tagging of the provider by the provider switch SWA1 is designated VLAN_A. The source MAC address of a data packet in the customer's own virtual network VLAN_a, to which the provider's tag VLAN_A is added by cascading, should then be entered in the administration table with the index (VLAN_A, VLAN_a). This index re-establishes the unambiguity between the customer VLAN and the provider VLAN. Only data packets with an identical VLAN_A and VLAN_a value can interact.

According to a second embodiment the method according to the invention is retained with the proviso that the switch SWA1 capable of filtering N cascading levels does not filter only if the cascading level recognized in the data packets exceeds a value of N+1. With this configuration the problem cited in connection with MAC address spoofing, namely that the same MAC addresses disrupt each other in different VLANs, could occur however in the case of a redundant connection via a VLAN STP method (Spanning Tree Protocol) and use of identical MAC addresses in different VLANs. For this reason the first exemplary embodiment should be given preference in practical implementations.

The method according to the invention or a switch configured according to the invention is advantageously used when connecting customers of a service provider via transparent Ethernet services. "Transparent" means direct tunneling of the obtained or sent data with the possibility of also being able to connect further switches to the data port made available. In this case tagged data packets are sent to the provider switch SWA1, cf. above. Using the proposed means according to the invention a restriction to 4094 connections, caused by the predefined length of the tag, is lifted.

The invention claimed is:

1. A network node unit for forwarding data packets, each data packet having a first virtual local area network identification comprising a first virtual local area network tag, the network node unit comprising:
   the network node unit having a predefined cascading depth;
   the network node unit configured to identify a cascading depth of a data packet received by the network node unit;
   the network node unit configured to add via cascading a second virtual local area network tag to the first virtual local area network identification of the received data packet if the identified cascading depth is less than the predefined cascading depth, the second virtual local area network tag being different than the first virtual local area network tag;
   the network node unit configured to filter and forward the received data packet as a function of the predefined cascading depth and the identified cascading depth of the received data packet; and
   the network node unit configured to update an administration table with the second virtual local area network tag and the first virtual local area network tag of the data packet as a function of the predefined cascading depth and the identified cascading depth of the received data packet.

2. The network node unit of claim 1 wherein the network node unit is a switch or a switch device.

3. The network node unit of claim 1 wherein the predefined cascading depth of the network node unit defines a learning limit for the network node unit such that the network node unit does not update the administrative table if the identified cascading depth for the received data packet is greater than the predefined cascading depth of the network node unit.

4. The network node unit of claim 3 wherein the predefined cascading depth of the network node unit defines a filtering limit for the network node unit such that the network node unit does not filter the received data packet if the identified cascading depth for the received data packet is greater than the predefined cascading depth of the network node unit.

5. The network node unit of claim 1 wherein the predefined cascading depth has a value correlating to a hierarchical virtual local area network identification having an original virtual tag and another virtual tag added in front of the original virtual tag, the original virtual tag being the first virtual tag and the second virtual tag being the virtual tag added in front of the original virtual tag.

6. The network node unit of claim 1 wherein the network node unit is also configured such that the first virtual tag identifies a customer virtual tag and the second virtual tag identifies a network provider tag and wherein the network node unit is a switch of a network provider.

7. A method for forwarding data packets which are provided with a virtual local area network identification, the method comprising:
   a node device identifying a cascading depth of a virtual local area network identification in a first data packet which exceeds a predefined cascading depth;
   the node device providing filtered forwarding of the data packets as a function of the predefined cascading depth and the identified cascading depth of the virtual local area network identification in the first data packet; and
   the node device adding a virtual tag to the virtual local area network identification of the first data packet and address information identified in the virtual local area network identification of the first data packet in an administration table as a function of the predefined cascading depth and the identified cascading depth.

8. A non-transitory computer readable medium configured for being loaded onto a network node unit so that the network node unit performs a method comprising:
   providing a predefinable cascading depth;
   receiving a data packet having a virtual network identification comprising a first virtual local area network tag and address information;
   identifying a cascading depth of the virtual local area network identification of the data packet;
   filtered forwarding of data packets provided with a cascaded virtual local area network identification as a function of the predefinable cascading depth and the identified cascading depth; and
   updating an administration table with the virtual local area network identification tag and address information of the data packet as a function of the predefinable cascading depth and the identified cascading depth.

* * * * *